(12) United States Patent
Holmes

(10) Patent No.: US 12,190,553 B2
(45) Date of Patent: Jan. 7, 2025

(54) SYSTEMS AND METHODS FOR SOFTWARE-BASED VIDEO CONFERENCE CAMERA LIGHTING

(71) Applicant: Russell Holmes, Otley (GB)

(72) Inventor: Russell Holmes, Otley (GB)

(*) Notice: Subject to any disclaimer, the term of this patent is extended or adjusted under 35 U.S.C. 154(b) by 205 days.

(21) Appl. No.: 17/945,677

(22) Filed: Sep. 15, 2022

(65) Prior Publication Data

US 2023/0085287 A1    Mar. 16, 2023

Related U.S. Application Data

(60) Provisional application No. 63/244,569, filed on Sep. 15, 2021.

(51) Int. Cl.
| | |
|---|---|
| *G06V 10/141* | (2022.01) |
| *G06V 10/28* | (2022.01) |
| *G06V 10/60* | (2022.01) |
| *G06V 40/10* | (2022.01) |
| *H04L 12/18* | (2006.01) |
| *H04N 7/15* | (2006.01) |
| *H04N 23/63* | (2023.01) |
| *H04N 23/74* | (2023.01) |

(52) U.S. Cl.
CPC ............ *G06V 10/141* (2022.01); *G06V 10/28* (2022.01); *G06V 10/60* (2022.01); *G06V 40/10* (2022.01); *H04L 12/1813* (2013.01); *H04N 7/15* (2013.01); *H04N 23/632* (2023.01); *H04N 23/74* (2023.01)

(58) Field of Classification Search
None
See application file for complete search history.

(56) References Cited

U.S. PATENT DOCUMENTS

| | | | |
|---|---|---|---|
| 2015/0163410 A1* | 6/2015 | Yamazaki | H04N 23/63 348/333.11 |
| 2019/0356837 A1* | 11/2019 | Bakshi | H04N 7/142 |

* cited by examiner

*Primary Examiner* — Hemant S Patel

(57) ABSTRACT

A computer-implemented lighting system for video recording and display includes: a first user device featuring a front-facing camera, a front-facing display, a processor, a memory, and a networking interface; and a second user device featuring a front-facing camera, a front-facing display, a processor, a memory, and a networking interface; wherein the first user device's processor: receives a first video captured by the second user device's front-facing camera; displays the first video on the first user device's display, wherein a portion of the first video is replaced by one or more lighting elements; and captures a second video using the first user device's front-facing camera, wherein the second video is illuminated during capture, in part, by the one or more lighting elements.

17 Claims, 14 Drawing Sheets

SYSTEMS AND METHODS FOR SOFTWARE-BASED VIDEO CONFERENCE CAMERA LIGHTING

CROSS-REFERENCE TO RELATED APPLICATIONS

This application claims the benefit of priority of U.S. Application No. 63/244,569 filed Sep. 15, 2021, which is hereby incorporated by reference.

BACKGROUND OF THE INVENTION

The present subject matter relates generally to systems and methods for providing a software-based video conference camera lighting. More specifically, the present invention relates to systems and methods in a video conference between a first participant and a second participant for using portions of the first participant's display to provide lighting of the first participant.

More than a billion smartphone users worldwide have a front-facing selfie camera on their mobile device. The "selfie" is a key part of smartphone photography, video capture, and video conferencing.

Front-facing cameras (i.e., cameras capable of capturing an image of a user that is looking at the display of the device) often do not have their own separate flash/lighting modules and, therefore, do not have the hardware required to produce high quality photographs or videos in low-level lighting or other difficult lighting conditions. To address this hardware limitation, there are a number of current systems and methods for selfie photography that turn the entire smartphone display screen white as a photograph is taken to cast light onto the scene/person whose image is being captured.

The drawback of the "flashing white screen" solution is that the user cannot see the displayed image at the moment of capture (arguably one of the primary benefits of using a selfie/front facing camera), which is an even more significant issue when using the front-facing camera to capture video, as the display would need to be in a continuous white screen state preventing the user from using the display to align the scene they wish to capture. This solution also cannot be used in video conferencing without entirely eliminating the first participant's ability to see the second participant.

Accordingly, there is a need for systems and methods for improving lighting conditions of photographs and videos taken using a front-facing camera by providing software-based video conference camera lighting in which a first participant's video display shows a live video feed of a second participant, while additionally using at least a portion of the first participant's video display to light the first participant, as described herein.

BRIEF SUMMARY OF THE INVENTION

To meet the needs described above and others, the present disclosure provides systems and methods for software-based solutions for improving lighting conditions of photographs and videos taken using a front-facing camera, i.e., the lighting system. In a primary embodiment of the lighting system, a portion of a mobile device display is used to show an image of the scene being captured by a front-facing camera and/or a live video feed of another participant in a video conference while another portion of the mobile device display is used to light the scene being captured. Although the primary embodiment of the lighting system described herein relates to the operation of a mobile device (e.g., smartphone, tablet, dedicated video mobile calling devices such as the one sold by Facebook under the trademark Portal, etc.), it is understood that the teachings provided are equally applicable to any situation in which a user is capturing an image or video of themselves while viewing a display, including personal computer and laptop systems, office-based teleconferencing systems, etc., as will be understood by those skilled in the art based on the descriptions provided herein.

A first example illustrating an application of the lighting system taught herein includes two users participating in a video conference with each other using their smartphones. In this example, each user communicates with the other using a smartphone running video conference software enabling each user to view a live video feed of the other user on a front facing display of their device while simultaneously capturing a live video feed of themselves using a front facing camera of their device. As used herein, the term "front facing" refers to the location of an element (e.g., a display, a camera, etc.) located on the display side of a device such that the element faces the user when the user is facing the display. For example, a typical smartphone or tablet includes a front facing display (e.g., touchscreen display), a front facing camera (e.g., selfie camera), and a rear facing camera (e.g., primary camera). A typical laptop computer includes a front facing display (e.g., laptop display screen) and a front facing camera (e.g., integrated web camera). A typical desktop personal computer that is configured for video conferencing includes a front facing display (e.g., monitor) and a front facing camera (e.g., web camera).

In this first example, each user's chat software enables their device to use the display lighting functionality taught herein. For example, if the lighting conditions for the first user are such that the video feed of the first user captured by the first device are sub-optimal (e.g., the first user is in a low light or dark environment), the first user may employ display lighting to improve the lighting conditions for the capture of the video feed. To do so, the system identifies areas of the first display that are to be used for lighting while displaying the live video feed of the second user captured by the second device.

In one embodiment, the lighting system may identify the areas of the first display to be used for lighting based on a user selection. In some instances, the first user (who is viewing the display that is to be used for lighting) makes a selection as to the areas of the first display that are to be used for lighting. In another instances, the second user (whose video is being viewed by the first user) makes a selection as to the areas of the first display that are to be used for lighting. In other instances, the selection of the areas of the first display that are to be used for lighting analysis may be completed by the system, whether by a processor of the first user's device, a processor of the second user's device, or a processor in another system device, such as a server through which the videos are routed between the two user devices.

Segmentation of the video feed (i.e., the separation of an object from a background in a video) may enable more precise and more naturally integrated feeling lighting schemes, as will be described herein. Any suitable segmentation method may be used to accomplish the advantages and objectives of the subject matter presented herein, including, for example, using computer vision, semantic segmentation, AI-based segmentation, instance segmentation, K-clustering, edge detection, kernel density estimation, Gaussian mixture model, etc.).

In some examples, the areas of the first display that are to be used for lighting may be bars (i.e., strips) located along one or more edges of the display. In other examples, the areas of the first display that are to be used for lighting may be circular "bulb-like" areas forming a perimeter around one or more edges of the display. Other geometric shapes may be used for the lighting, as will be understood by those skilled in the art based on the teachings provided herein.

In some examples, the lighting may be overlaid on the foreground of the video feed to maximize the lighting effect. In other examples, the lighting bars may be layered into the background of the video feed behind a segmented first layer (e.g., a person shown as the subject in the live video feed) so as to not obscure, and to give priority to, the principal content of the video feed.

In other examples, the areas of the first display that are to be used for lighting may be the portions of the display that would otherwise be displaying an identified background segment of the video. For example, in a typical selfie-style video chat between two users, the image of each user may be segmented from the background and the entirety of the segmented background may then be replaced by lighting.

The lighting system may enable users to turn on or off the display lighting (i.e., lighting filter) manually. In some instances, such as when the lighting system recognizes there is poor lighting by analyzing the lighting conditions being captured by either front facing or rear facing cameras, users may be prompted to engage the lighting filter. In other instances, a lighting filter may automatically be applied by the system in response to ambient lighting environments identified by the one or more cameras.

To further illustrate the lighting system provided herein, additional examples of the system and its uses are described. In one arrangement, a front facing camera of a first user's mobile device (e.g., smartphone) is activated and begins capturing video as part of a telecommunication connection between two or more users. The captured video is displayed on a second user's mobile device display (e.g., smartphone touchscreen display) and in a picture-in-picture (PIP) window shown on the first user's mobile device display. In order to improve the lighting conditions for the video being captured of the first user by the first user's mobile device, lighting effects including a border of bright and/or white light shines around the edge of the display screen of the first user's mobile device illuminating the first caller. Depending on the arrangement of the lighting system, the second caller may or may not be able to see the white light border on the display of the second user device. For example, the PIP window of the second user's mobile device may show the live video feed of the second user as well as the lighting effects treatment applied by the first user device. This arrangement enables the second user to more clearly visualize what is being displayed to the first user (e.g., the video and the lighting effects).

In some examples, both of the participants in the video call may be in low-light or dark environments and each may activate lighting effects on their mobile devices simultaneously to improve their respective lighting. In such an example, each user's device may include one or more lighting effects and each user's device may show a PIP window that shows the live video feed being sent to the other user, as well as the lighting effects treatment applied by the user's device so that each user can more clearly visualize what is being displayed to each user.

In other embodiments, the location and shape the lighting effects may be something other than a simple border. The illumination may be provided using any shapes, including, for example, one or more dedicated lighting sections at the top or bottom of the screen. In another example, a ring-type shape may be provided in the middle of the display screen.

It is contemplated that the lighting shapes/configurations may be user selected options or may be determined by the lighting system based on an analysis of the lighting conditions and/or the content of the video being captured. For example, the lighting system may be able to identify the magnitude of lighting effects required to optimize the video capture based on ambient lighting information acquired through the one or more cameras and/or analysis of the video being captured, for example, by evaluating the contrast level, shadows, etc. in the captured video. When the lighting demands are determined to be greater (i.e., lower quality ambient light, lower quantity ambient light, etc.), the lighting system may use a greater proportion of the display for lighting than it would when the lighting demands are determined to be lesser.

In another embodiment, the lighting shapes/configurations are determined by segmenting the object(s) of interest from the background in the captured video. In some examples, this segmentation is enabled by the use of a spatial, distance, or depth-sensing camera (i.e., range camera, time-of-flight camera, LIDAR, the camera sold by Apple Inc. under the registered trademark TrueDepth, etc.) or similar as the front facing camera. Generally speaking, the object of interest is primarily going to be the first user. However, the object of interest may be another object (animate or inanimate), such as a pet or a piano. When segmented, the background shape identified behind the object of interest can be used to provide the lighting. For example, the entirety of the segmented background may be replaced by a bright/and or white light to illuminate the video image of the other user viewing the display. In some embodiments, both users' captured videos are segmented into object of interest and background segments and both of the background segments are replaced by lighting effects. In other embodiments, only one of the users' captured videos are segmented into object of interest and background segments and replaced by lighting effects.

It is contemplated that the PIP display for each device may or may not show the lighting effects being applied on the other device. Displaying the lighting effects employed by the other device enables the PIP viewing user to see the exact image that is being displayed to the other user(s).

It is further contemplated that the lighting effects may or may not overlap the PIP window image. In other words, in some instances, the lighting effects will be further in the foreground than the PIP window and, in other instances, the lighting effects will be further in the background than the PIP window. A user setting may enable prioritization of the PIP window or the lighting effects.

In addition to providing various options as to the size, the shape, and the location of the lighting effects, the brightness of the lighting effects may be varied. Similarly, the color, or temperature, of the lighting effects may be varied. The brightness and color of the lighting effects may be adjusted manually or automatically by the system based on an analysis of the ambient conditions and/or the quality of the captured video. The brightness and temperature of the lighting effects may be independently controlled relative to other displayed elements such that the system may, for example, increase or decrease the brightness of the lighting effects without affecting the brightness of the video feed.

In addition to the examples provided above describing how the lighting effects are provided by manipulating various portions of the display screen, it is contemplated that one or more lighting modules may be provided in addition to the user device display to substitute for or to supplement the lighting effects described above. For example an LED light ring may be provided around a display along the border of a smartphone. Such additional lighting modules may be integrated into the system such that the lighting system is able to turn on and off additional lighting modules as needed to replace or complement the lighting effects on the display. Control of the additional lighting modules may be manual or automated by the lighting system. Similar to the control of the lighting effects, the control of the additional lighting may be automated based on an analysis of the ambient lighting conditions and/or an analysis of the captured video. The integration of additional lighting modules provides a greater range of options for the system to illuminate the users. The lighting system may be manually controlled by the user or may be automatically controlled by the system to: (i) provide no lighting; (ii) provide lighting using only the device display; (iii) provide lighting using only the lighting modules; or (iv) provide lighting using both the device display and the lighting modules.

While primarily described above with respect to video conference calls, the solutions provided herein can be adapted and applied to selfie photography and videography (i.e., a user taking a picture or video of themselves using a front facing camera). In these instances, the lighting effects are used to improve the lighting of a photograph or video, typically to be captured and stored by the user device, but are otherwise nearly perfectly analogous to the examples provided above.

For example, foreground lighting elements may be used to provide lighting from the device's display to illuminate the user when using the device's front facing camera for selfie photography and videography. Similarly, the lighting elements may be background lighting elements (i.e., may not overlap the image of the user on the display) or may even occupy an entirety of a segmented background area of the display when using the device's front facing camera for selfie photography and videography.

When saving a photograph or video to the device's memory, the captured content may be stored such that it includes a representation of the lighting effects that were used at the time of capture (e.g., the lighting effects are superimposed on the photograph or video), such that the captured content does not include a representation of the lighting effects, or such that the device stores a copy of each version of the captured content. For example, when reviewing a stored photograph, a user may be able to toggle between two versions of the photograph, one including the lighting effects and one without. In some embodiments, the saved image may provide the user an option to turn on and off the lighting effect while viewing a saved photograph.

In some examples, the display may provide a picture-in-picture display that may or may not show the lighting effects. For example, the main portion of the display may show the user and the lighting effects while the picture-in-picture shows the content that is to be captured and stored without the lighting effects. In another example, the main portion of the display may show the user and the lighting effects while the picture-in-picture shows the content that would have been taken before the lighting effects were applied. Like the lighting effects themselves, these picture-in-picture representations may be captured and stored as part of the photograph or video file such that the user may later view the photograph or video with or without the picture-in-picture display.

Another feature that may be more relevant for selfie photography and videography, rather than for video conference calls (though could be used in connection with either), is the ability to manually or automatically turn off and on the lighting effect while preparing for and then capturing an image or video. For example, the user device, through the front facing camera, may frame a user and a background. Within the framed image, the user device may segment the image into an object of interest (i.e., the user) and a background. The lighting effects may be configured to replace the background with a bright white image. However, when lining the photograph up, the actual background is displayed to the user (i.e., without the lighting effects) and then, in response to the user taking action to turn on the lighting effects or taking action to capture the photograph or video, the segmented background is replaced with the lighting effects such that they illuminate the user. In this manner, the user is able to properly frame the photograph or video to be captured, including the background, and the lighting effects are able to illuminate the user to improve the quality of the lighting of the content captured.

The lighting system may provide visual feedback to a user through the device's display, such as an image, an icon, or text, to communicate to the user whether or not any lighting effects will be applied to the content to be captured. Similarly an image, icon, or text may be displayed in connection with stored content to communicate whether the content was stored using one or more lighting effects.

As described herein, in some embodiments, the lighting system will automatically suggest or automatically apply one or more lighting effects in response to the ambient environment. For example, when the device determines that the quality of the lighting in the content to be captured would be improved by providing one or more lighting effects (for example, by observing the ambient lighting conditions using the front facing camera), the lighting system may present the user with an option to activate one or more lighting elements or to authorize the lighting elements to be automatically activated by the lighting system.

In one example, a computer-implemented lighting system for video recording and display includes: a first user device featuring a front-facing camera, a front-facing display, a processor, a memory, and a networking interface; and a second user device featuring a front-facing camera, a front-facing display, a processor, a memory, and a networking interface; wherein the first user device's processor: receives a first video captured by the second user device's front-facing camera; displays the first video on the first user device's display, wherein a portion of the first video is replaced by one or more lighting elements on the first user device's display; and captures a second video using the first user device's front-facing camera, wherein the second video is illuminated during capture, in part, by the one or more lighting elements on the first user device's display.

The first video may include video of an object of interest (e.g., the second user) and a background and one of the first user device's processor and the second user device's processor: identifies and segments the object of interest from the background in the first video; and replaces at least a portion of the segmented background in the first video with the one or more lighting elements.

The operation of the one or more lighting elements on the first user device's display may be user controlled or may be automatically controlled by the first user device's processor.

In some examples, the second user device's processor: receives a second video captured by the first user device's front-facing camera; displays the second video on the second user device's display, wherein a portion of the second video is replaced by a second set of one or more lighting elements on the second user device's display; and captures a first video using the second user device's front-facing camera, wherein the first video is illuminated during capture, in part, by the second set of one or more lighting elements on the second user device's display.

The lighting elements may overlap a picture-in-picture element shown on the first user device's display.

The lighting elements displayed on the first user device's display may be replicated on a picture-in-picture display on the second user device's display such that the picture-in-picture display on the second user device's display replicates the first user device's display.

The lighting elements displayed on the first user device's display may not be replicated on a picture-in-picture display on the second user device's display such that the picture-in-picture display on the second user device's display shows the first video without any representation of the lighting elements displayed on the first user device's display.

A picture-in-picture display on the second user device's display may indicate the operation of the one or more lighting elements on the first user device's display.

A brightness of the one or more lighting elements on the first user device's display automatically adjust based on ambient lighting conditions detected by the first user device.

A brightness of the one or more lighting elements on the first user device's display and a brightness of the first video displayed on the first user device's display may be independently adjustable.

A brightness of the second user device's may be controlled by the first user device's processor.

The one or more lighting elements on the first user device's display may replace a segmented background element in the first video.

The one or more lighting elements on the first user device's display may be displayed behind a segmented head and shoulders captured by the second user device's front-facing camera.

In another example, a computer-implemented lighting system for video recording and display includes: a first user device featuring a front-facing camera, a front-facing display, a processor, a memory, and a networking interface; and a second user device featuring a front-facing camera, a front-facing display, a processor, a memory, and a networking interface; wherein the first user device's processor: receives a first video captured by the second user device's front-facing camera; displays the first video on the first user device's display, wherein a portion of the first video is replaced by a first set of one or more lighting elements on the first user device's display; automatically adjusts a brightness of the first set of one or more lighting elements on the first user device's display based on ambient lighting conditions detected by the first user device; and captures a second video using the first user device's front-facing camera, wherein the second video is illuminated during capture, in part, by the one or more lighting elements on the first user device's display; wherein the second user device's processor: receives a second video captured by the first user device's front-facing camera; displays the second video on the second user device's display, wherein a portion of the second video is replaced by a second set of one or more lighting elements on the second user device's display; automatically adjusts a brightness of the second set of one or more lighting elements on the second user device's display based on ambient lighting conditions detected by the second user device; and captures a first video using the second user device's front-facing camera, wherein the first video is illuminated during capture, in part, by the one or more lighting elements on the second user device's display.

In some embodiments, the first video includes video of an object of interest and a background and one of the first user device's processor and the second user device's processor: identifies and segments the object of interest from the background in the first video; and replaces at least a portion of the segmented background in the first video with the first set of one or more lighting elements; and the second video includes video of an object of interest and a background and one of the first user device's processor and the second user device's processor: identifies and segments the object of interest from the background in the second video; and replaces at least a portion of the segmented background in the second video with the second set of one or more lighting elements.

A brightness of the first set of one or more lighting elements on the first user device's display and a brightness of the first video displayed on the first user device's display may be independently adjustable and a brightness of the second set of one or more lighting elements on the second user device's display and a brightness of the second video displayed on the second user device's display may be independently adjustable.

A brightness of the first set of one or more lighting elements may be additionally controlled by the second user device's processor and a brightness of the second set of one or more lighting elements may be additionally controlled by the first user device's processor.

A brightness of the first set of one or more lighting elements may be additionally controlled by the first user device's processor and a brightness of the second set of one or more lighting elements may be additionally controlled by the second user device's processor.

The first set of one or more lighting elements on the first user device's display may be displayed behind a segmented head and shoulders captured by the second user device's front-facing camera and the second set of one or more lighting elements on the second user device's display may be displayed behind a segmented head and shoulders captured by the first user device's front-facing camera.

The first set of one or more lighting elements displayed on the first user device's display may be replicated on a picture-in-picture display on the second user device's display such that the picture-in-picture display on the second user device's display replicates the first user device's display and second set of one or more lighting elements displayed on the second user device's display may be replicated on a picture-in-picture display on the first user device's display such that the picture-in-picture display on the first user device's display replicates the second user device's display.

An object of the invention is to provide an improved lighting system for capturing video using the front facing camera of a device while lighting the scene using portions of the associated display.

Another object of the invention is to improve the quality of video images captured in low-light and dark environments.

Another object of the invention is to provide a convenient solution for removing shadows when communicating using the video chat function of a mobile device.

Another object of the invention is to replace a portion of a displayed video on a front-facing display with lighting elements that provide a beatification filer when capturing video with a front facing camera.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE DRAWINGS

Figure 1:
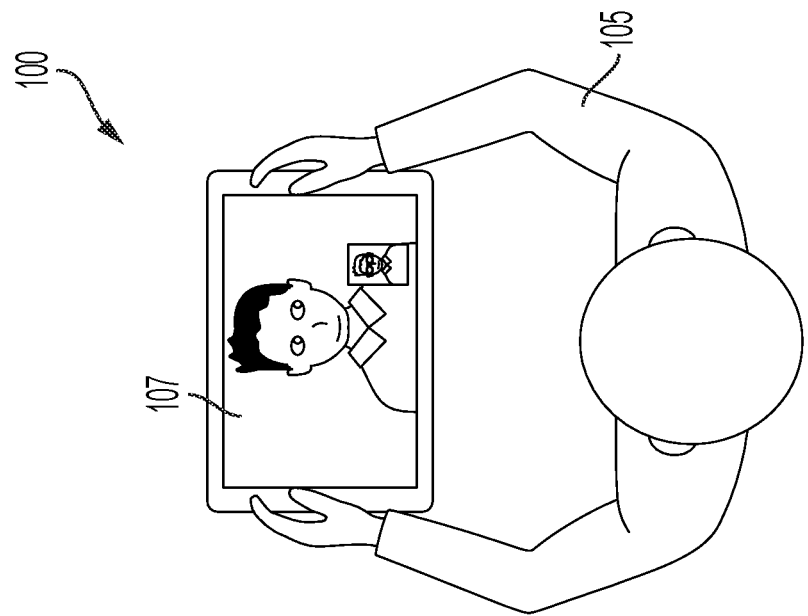
FIG. 1 is a schematic drawing of elements of a computer-implemented lighting system for video recording and display.
Figure 1:
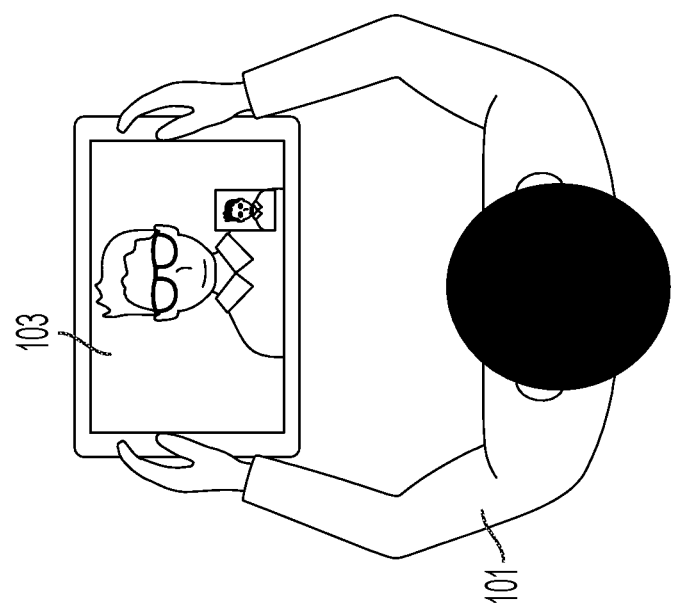

The present subject matter provides a computer-implemented lighting system for video recording and display 100 (the lighting system 100). In the example of the lighting system 100 shown in FIG. 1, the lighting system 100 is implemented in a video conference call between a first user 101 using a first user device 103 and a second user 105 using a second user device 107. Although the first user device 103 and the second user device 107 are shown as smartphones, it is understood that the first user device 103 and the second user device 107 may be any of a smartphone, a tablet, a video call specific portable device, a personal computer, a laptop, an office-based teleconferencing system, etc., as will be understood by those skilled in the art based on the teachings provided herein.

Figure 2:
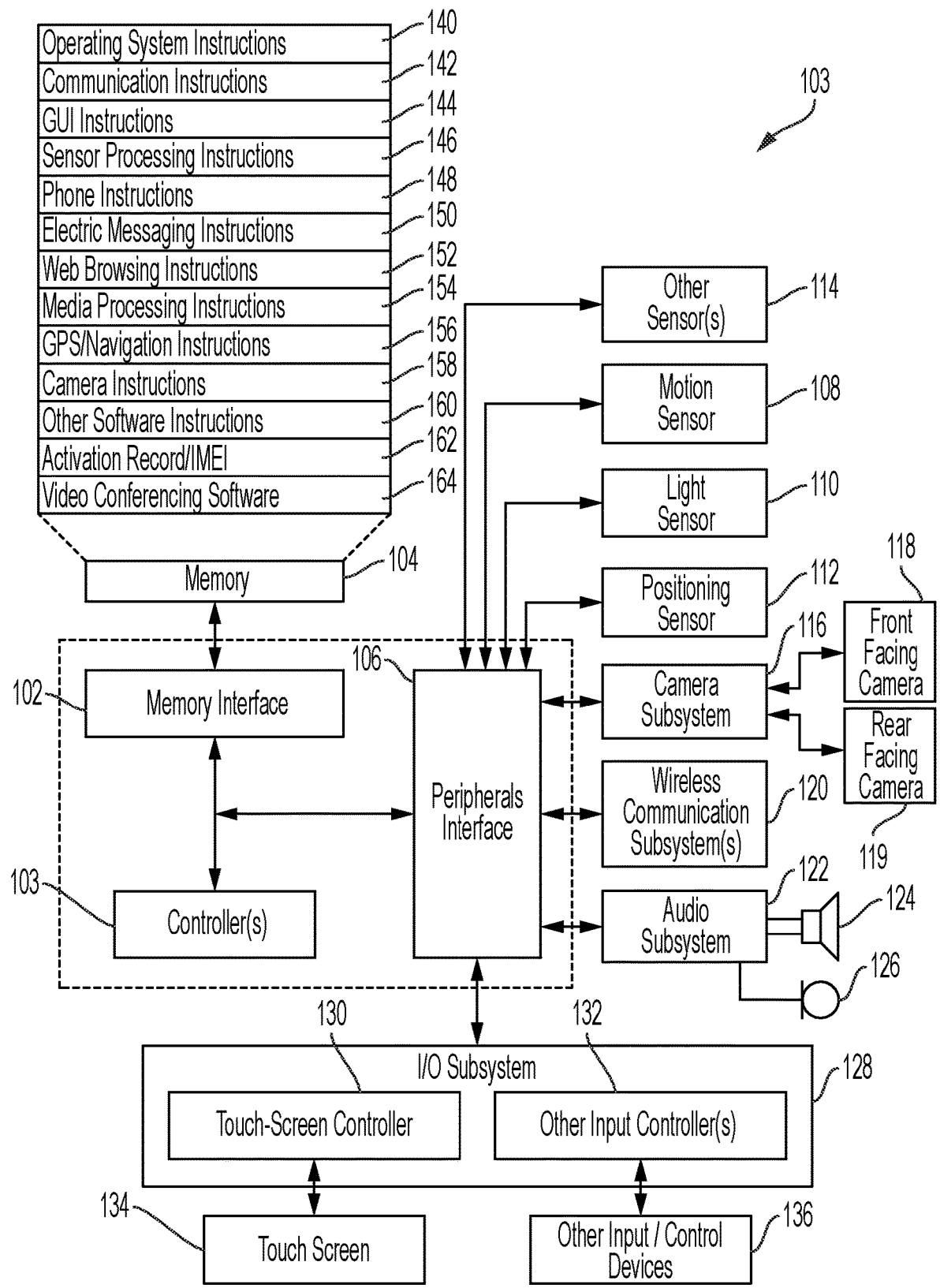
FIG. 2 is a schematic drawing of elements of a user device.

FIG. 2 illustrates the various systems of the first user device 103 shown in FIG. 1. It is contemplated that the second user device 107 may also be represented by the elements shown in FIG. 2.

FIG. 2 is a schematic diagram illustrating an example of the first user device 103 that may be used in the system shown in FIG. 1. In the example shown in FIG. 2, the lighting system 100 runs as a video conferencing application embodied in video conferencing software 164 on the first user device 103. As shown in FIG. 2, the first user device 103 maybe a mobile device, such as a smartphone, running video conferencing software 164 to provide the functionality described herein. A user may install the video conferencing software 164 on the first user device 103 via Apple's App Store, the Android Market, etc. The first user device 103 may include a wireless communication subsystem 120 to communicate with the second user device 107.

The first user device 103 may include a memory interface 102, controllers 109, such as one or more data processors, image processors and/or central processors, and a peripherals interface 106. The memory interface 102, the one or more controllers 109 and/or the peripherals interface 106 can be separate components or can be integrated in one or more integrated circuits. The various components in the first user device 103 can be coupled by one or more communication buses or signal lines, as will be recognized by those skilled in the art.

Sensors, devices, and additional subsystems can be coupled to the peripherals interface 106 to facilitate various functionalities. For example, a motion sensor 108, a light sensor 110, and positioning sensors 112 can be coupled to the peripherals interface 106 to facilitate orientation, lighting, and positioning functions. Other sensors 114 can also be connected to the peripherals interface 106, such as a proximity sensor, a temperature sensor, a biometric sensor, or other sensing device, to facilitate related functionalities.

A camera subsystem 116 includes a physical camera (e.g., a charged coupled device (CCD) or a complementary metal-oxide semiconductor (CMOS) optical sensor) which can be utilized to facilitate camera functions, such as recording photographs and video clips. Modern smartphones and other mobile devices typically feature more than one physical camera operated by the camera subsystem 116. Such cameras may be located on the front of the first user device 103—the side of the device with a touch screen display 134 (e.g., front facing cameras 118) or rear of the first user device 103—the side opposite the touch screen display 134 (e.g., rear facing cameras 119).

Communication functions can be facilitated through a network interface, such as one or more wireless communication subsystems 120, which can include radio frequency receivers and transmitters and/or optical (e.g., infrared) receivers and transmitters. The specific design and implementation of the communication subsystem 120 can depend on the communication network(s) over which the first user device 103 is intended to operate. For example, the first user device 103 can include communication subsystems 120 designed to operate over a GSM network, a GPRS network, an EDGE network, a 2G network, a 3G network, a 4G network, a 5G network, a Wi-Fi or Imax network, and a Bluetooth network. In particular, the wireless communication subsystems 120 may include hosting protocols such that the user device 20 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 may include a touch screen controller 130 and/or other input controller(s) 132. The touch screen controller 130 can be coupled to a touch screen display 134. The touch screen display 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen display 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 may be coupled to memory 104. The memory 104 can include high-speed random access memory and/or non-volatile memory, such as one or more magnetic disk storage devices, one or more optical storage devices, and/or flash memory (e.g., NAND, NOR). The memory 104 may store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 104 may also store communication instructions 142 to facilitate communicating with one or more additional devices, one or more computers and/or one or more servers. The memory 104 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 104 may also store other software instructions controlling other processes and functions of the user device 20 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 104. As described above, the video conferencing software 164 is also stored in the memory 104 and run by the controllers 109.

Each of the above identified instructions and applications can correspond to a set of instructions for performing one or more functions described herein. These instructions need not be implemented as separate software programs, procedures, or modules. The memory 104 can include additional instructions or fewer instructions. Furthermore, various functions of the first user device 103 may be implemented in hardware and/or in software, including in one or more signal processing and/or application specific integrated circuits. Accordingly, the first user device 103, as shown in FIG. 2, may be adapted to perform any combination of the functionality described herein.

Aspects of the systems and methods described herein are controlled by one or more controllers 109. The one or more controllers 109 may be adapted run a variety of application programs, access and store data, including accessing and storing data in associated databases, and enable one or more interactions via the first user device 103. Typically, the one or more controllers 109 are implemented by one or more programmable data processing devices. The hardware elements, operating systems, and programming languages of such devices are conventional in nature, and it is presumed that those skilled in the art are adequately familiar therewith.

For example, the one or more controllers 109 may be a central control processing system utilizing a central processing unit (CPU), memory 104 and an interconnect bus. The CPU may contain a single microprocessor, or it may contain a plurality of microcontrollers 109 for configuring the CPU as a multi-processor system. The memory 104 include a main memory, such as a dynamic random access memory (DRAM) and cache, as well as a read only memory, such as a PROM, EPROM, FLASH-EPROM, or the like. The system may also include any form of volatile or non-volatile memory 104. In operation, the main memory is non-transitory and stores at least portions of instructions for execution by the CPU and data for processing in accord with the executed instructions.

The one or more controllers 109 may further include appropriate input/output ports for interconnection with one or more output displays (e.g., monitors, printers, touch screen displays 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 109 may include a graphics subsystem to drive the output display (e.g., touch screen display 134). The links of the peripherals to the system may be wired connections or use wireless communications.

Although summarized above as a smartphone-type implementation, those skilled in the art will recognize that the one or more controllers 109 also encompasses systems such as other mobile devices, host computers, servers, workstations, network terminals, PCs, and the like. In fact, the use of the term controller is intended to represent a broad category of components that are well known in the art.

Figure 3:
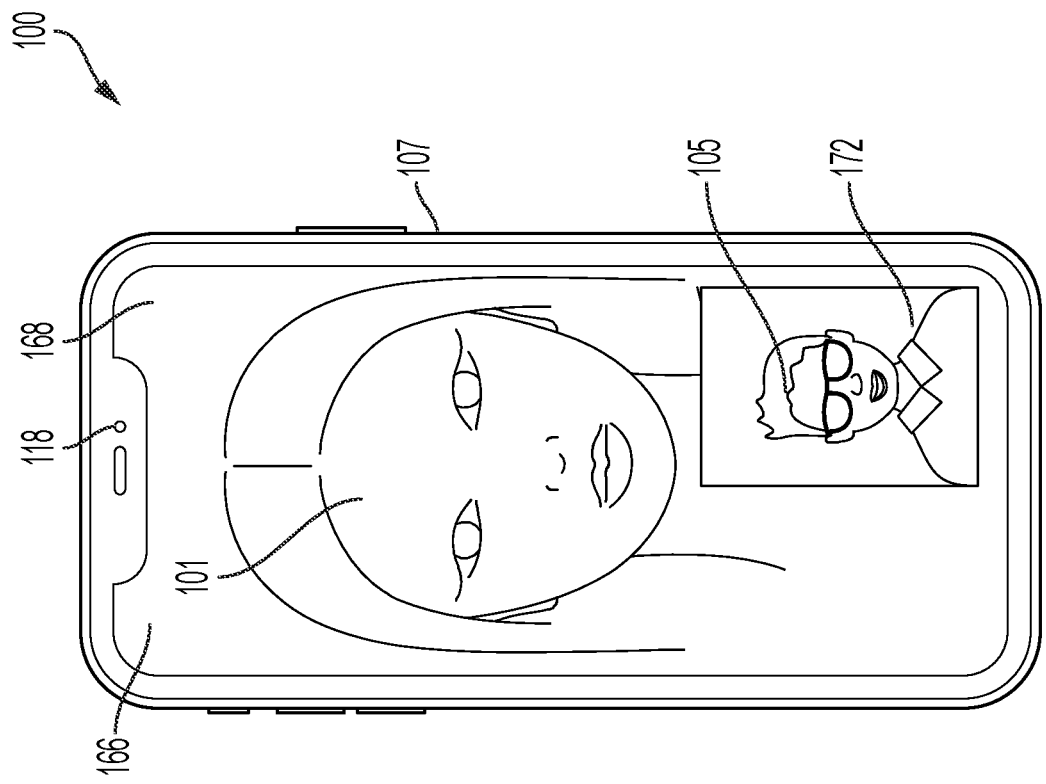
FIG. 3 illustrates an embodiment of the lighting system for video recording and display featuring single-user foreground lighting elements.
Figure 3:
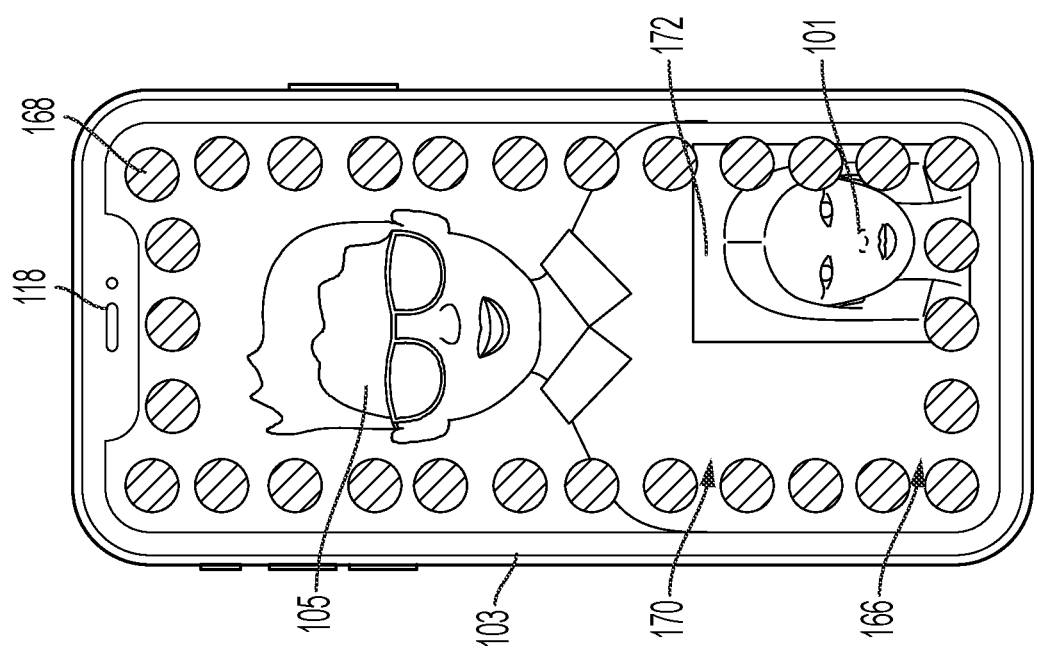

A first example illustrating an application of the lighting system 100 shown in FIG. 3 includes a first user 101 and a second user 105 participating in a video conference with each other using their smartphones 103 and 107. In this example, each user views a live video feed of the other user on a front facing display 166 (e.g., a touch screen display 134) while simultaneously capturing a live video feed of themselves using the front facing camera 118.

The lighting system 100 shown in FIG. 3 includes a first set of lighting elements 168 displayed as foreground lighting elements 168. As shown in FIG. 3, the first user device 103 includes a front facing camera 118 and a front facing display 166. When running the video conferencing software 164, the front facing display 166 provides a main display element 170 and a picture-in-picture display element 172. The main display element 170 displays a first live video feed featuring the second user 105 captured by the second user device 107 and the picture-in-picture display element 172 displays a second live video feed featuring the first user 101 captured by the first user device 103.

Similarly, the second user device 107 includes a front facing camera 118 and a front facing display 166. When running the video conferencing software 164, the front facing display 166 provides a main display element 170 and a picture-in-picture display element 172. The main display element 170 displays the second live video feed featuring the first user 101 captured by the first user device 103 and the picture-in-picture display element 172 displays the first live video feed featuring the second user 105 captured by the second user device 107.

In the example shown in FIG. 3, the first set of lighting elements 168 are displayed as foreground lighting elements 168 lining the perimeter of the front facing display 166. The lighting elements 168 shown are bright, white pixels that illuminate the face of the first user 101 to improve the lighting of the second live video being captured by the first user device 103. The lighting elements 168 in this example are shown as foreground lighting elements 168, meaning they are displayed in front of the videos shown on the main display element 170 and the picture-in-picture display element 172.

Figure 4:
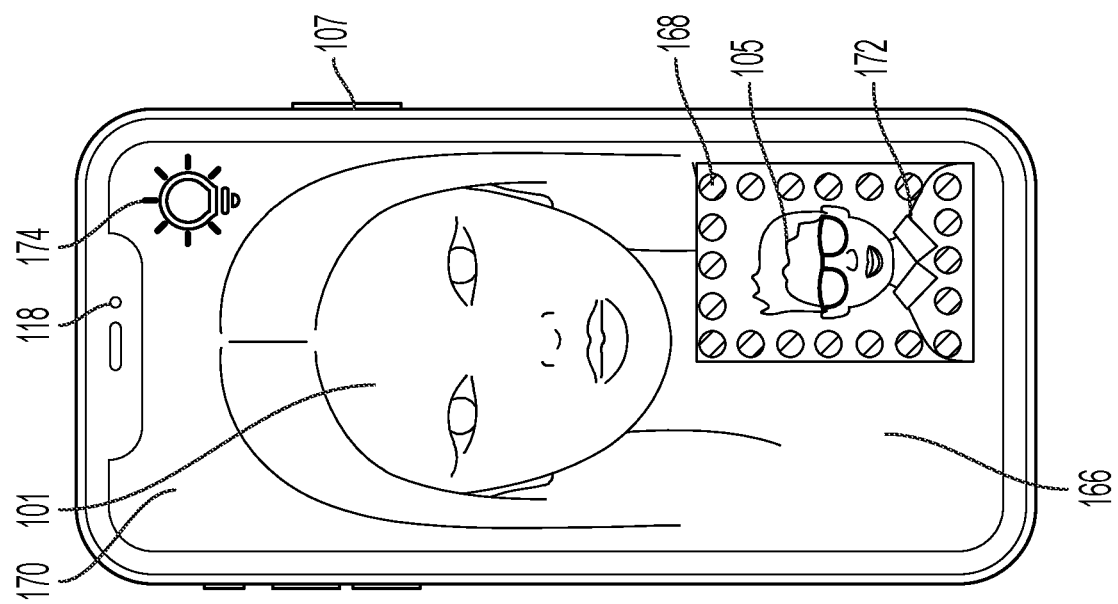
FIG. 4 illustrates an embodiment of the lighting system for video recording and display featuring an illumination indicator and lighting shown in a picture-in-picture display.
Figure 4:
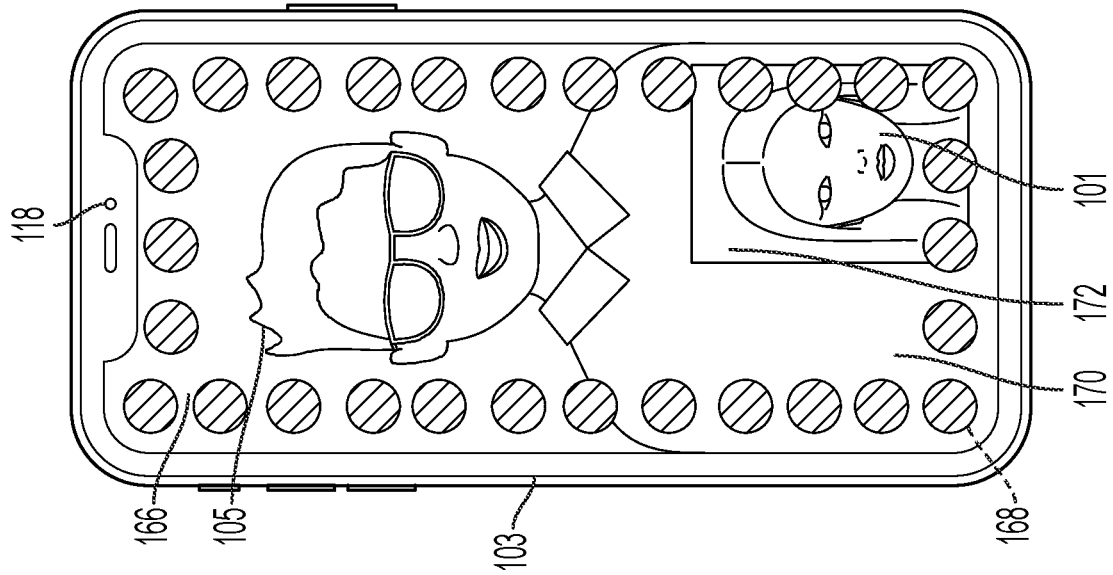

The example shown in FIG. 4 is similar to the example shown in FIG. 3, but adds an illumination indicator 174 and also displays the first set of lighting elements 168 in the picture-in-picture display element 172 on the second user device 107. Accordingly, the second user 105 is able to see that the first user device 103 is using a first set of lighting elements 168 to illuminate the first user 101 and can additionally see what the second user 105 looks like on the first user device 103 in combination with the first set of lighting elements 168.

Figure 5:
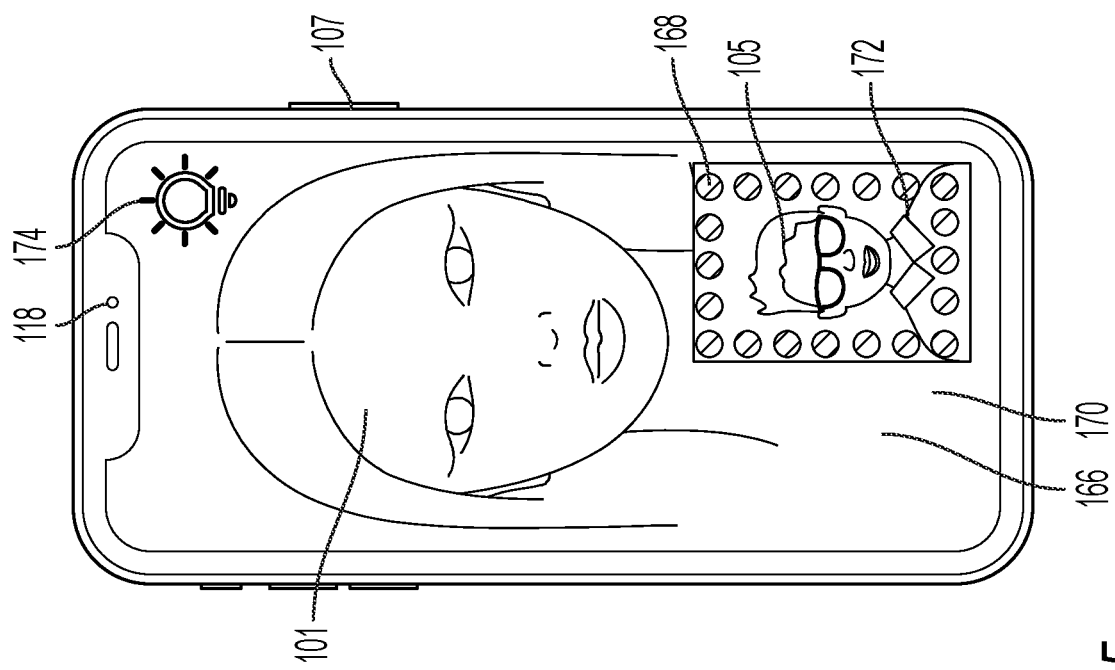
FIG. 5 illustrates an embodiment of the lighting system for video recording and display featuring a lighting effect segmented behind a user's head.
Figure 5:
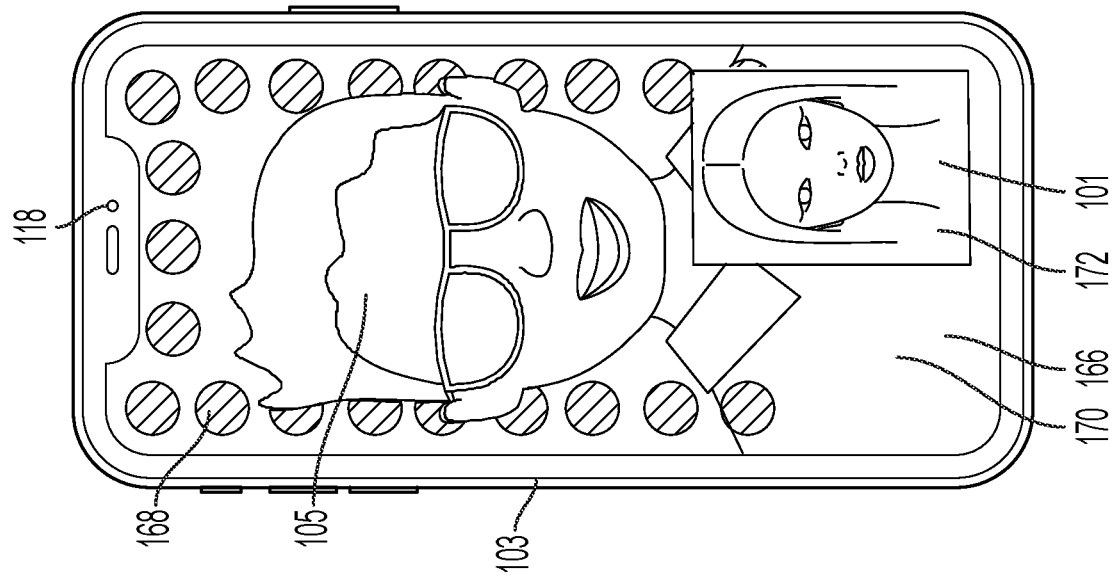

The example shown in FIG. 5 is similar to the example shown in FIG. 4, but the first set of lighting elements 168 are shown as background lighting elements 168 on the first user device 103. In other words, the lighting elements 168 disappear behind the video of the second user 105. The lighting elements 168 can be displayed as background lighting elements 168 when one of the first user device 103 and the second user device 107 segment the second user 105 from the background 176 in the first live video feed.

Figure 6:
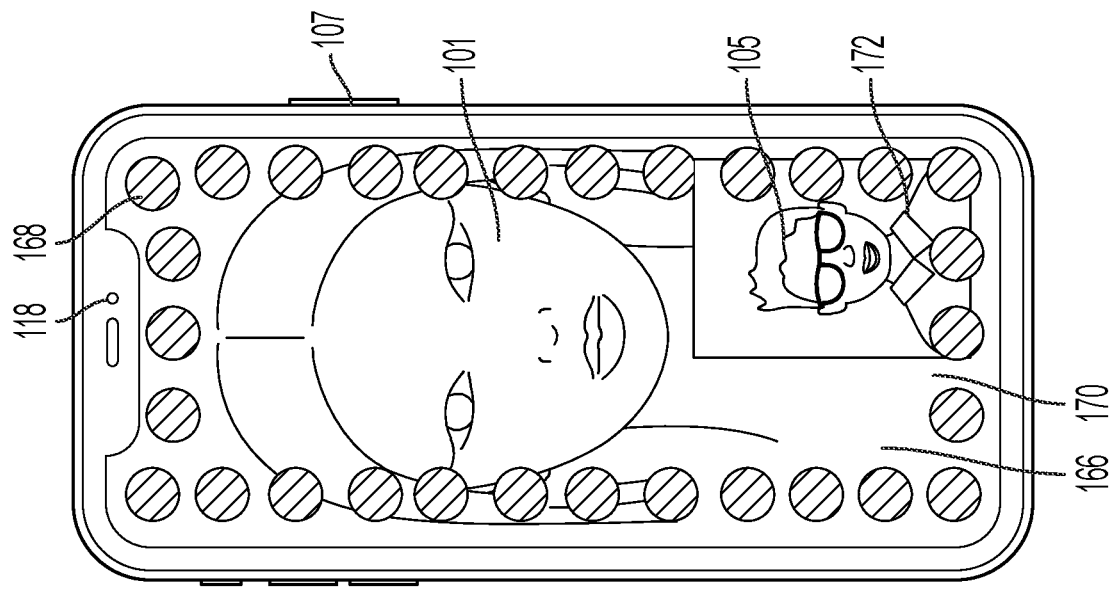
FIG. 6 illustrates an embodiment of the lighting system for video recording and display featuring foreground lighting on both user devices.
Figure 6:
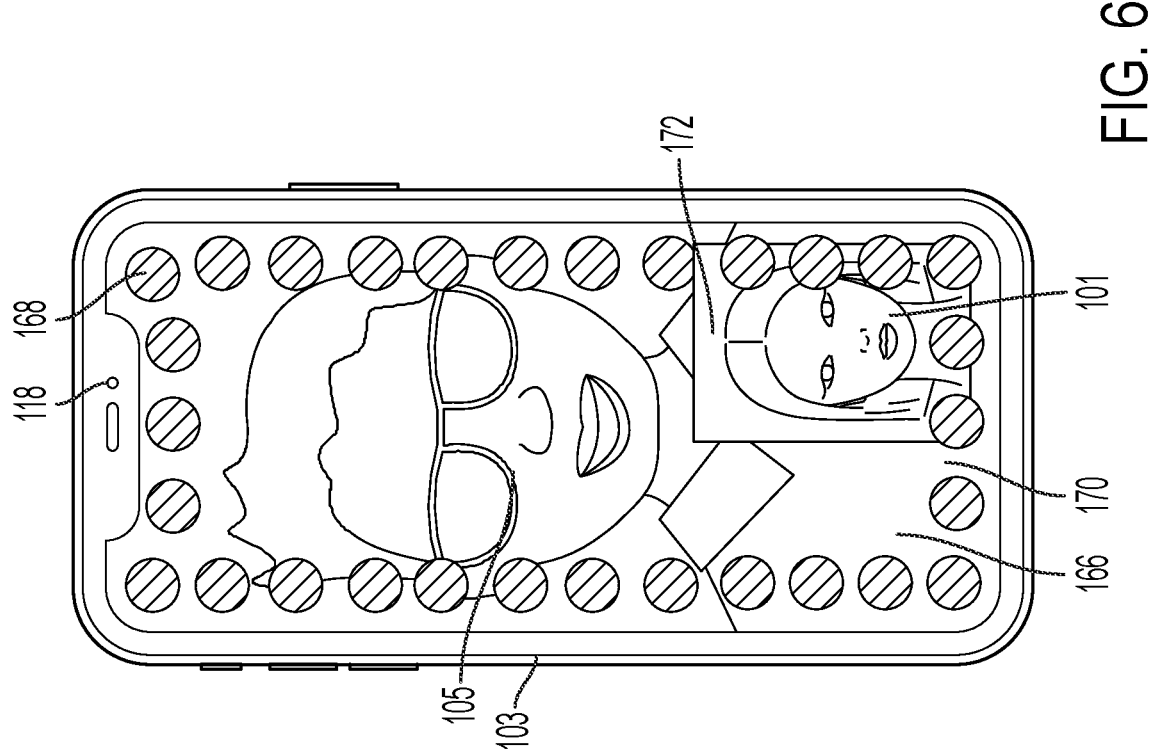

The example shown in FIG. 6 is similar to the example shown in FIG. 1, but the foreground lighting elements 168 are displayed on both of the first user device 103 and the second user device 107.

Figure 7:
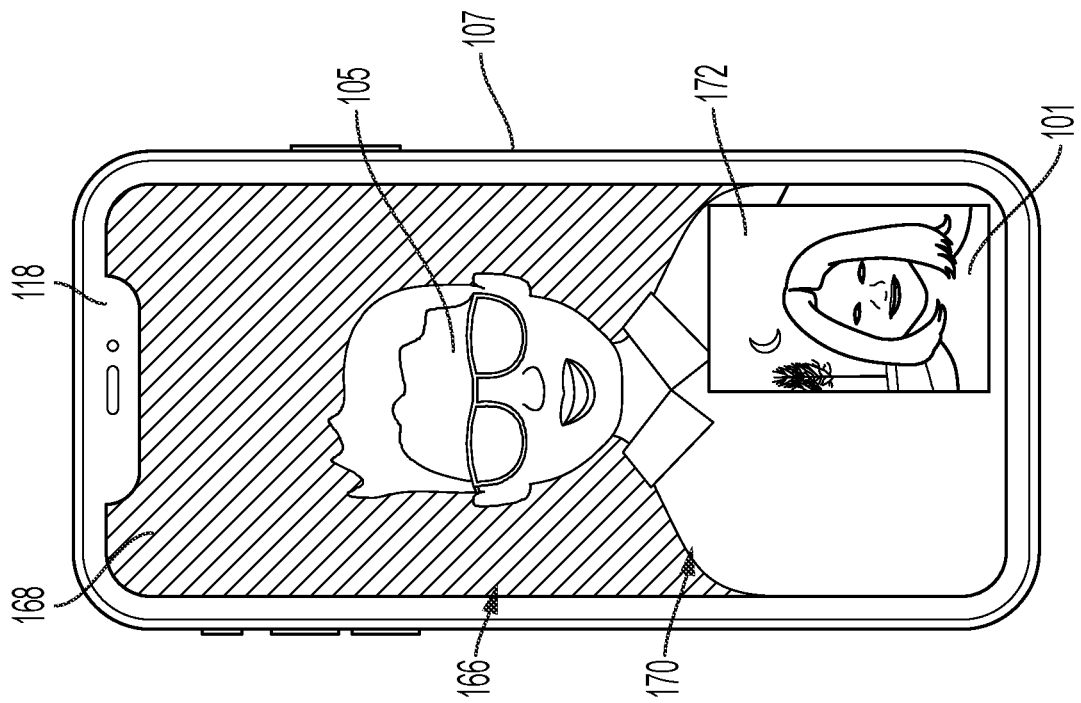
FIG. 7 illustrates an embodiment of the lighting system for video recording and display featuring a segmented background.
Figure 7:
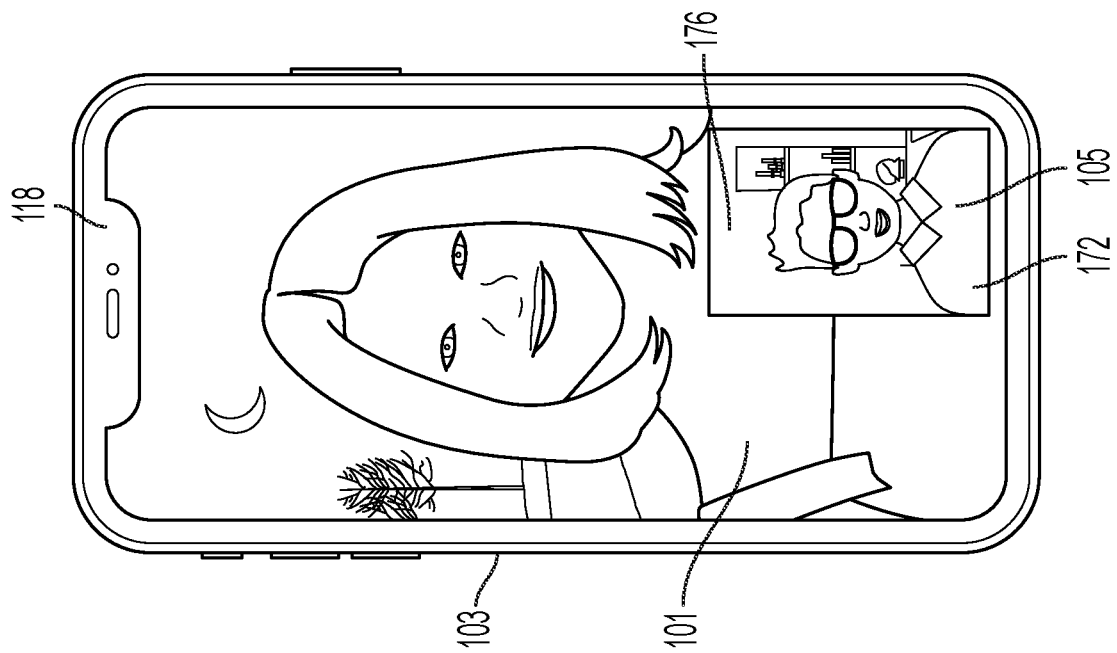
Figure 10:
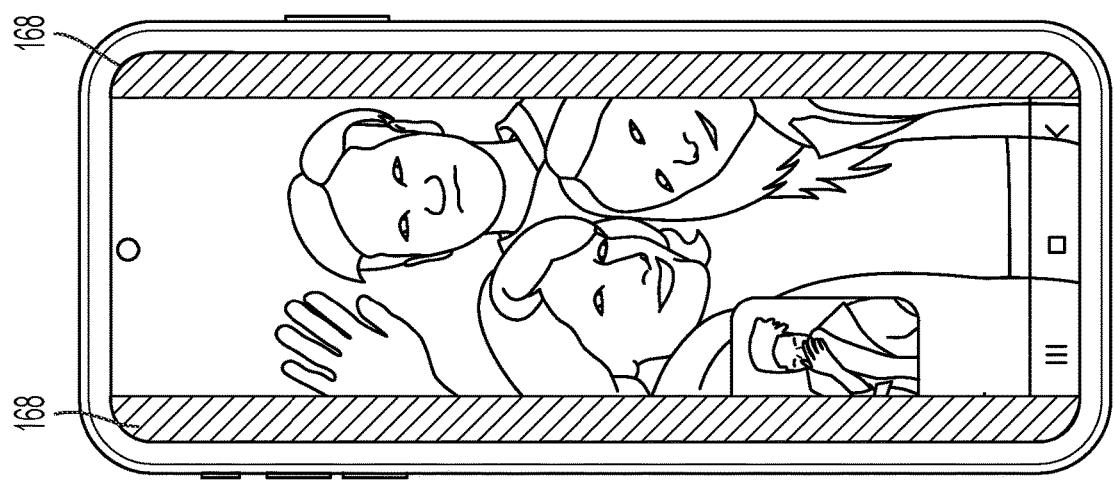
FIGS. 8-16 illustrate various lighting examples for use in the lighting system for video recording and display.
Figure 9:
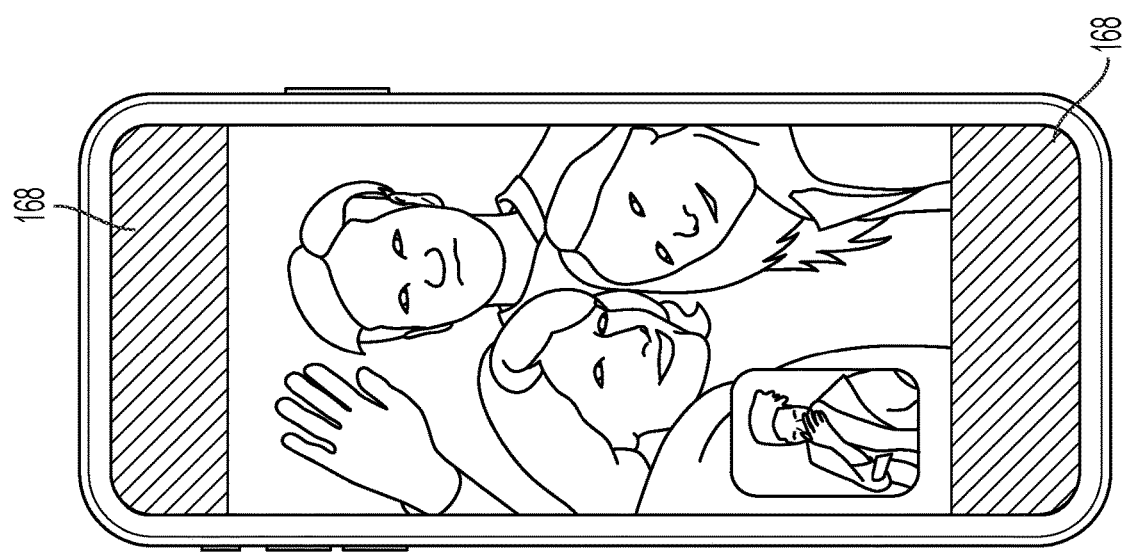
Figure 8:
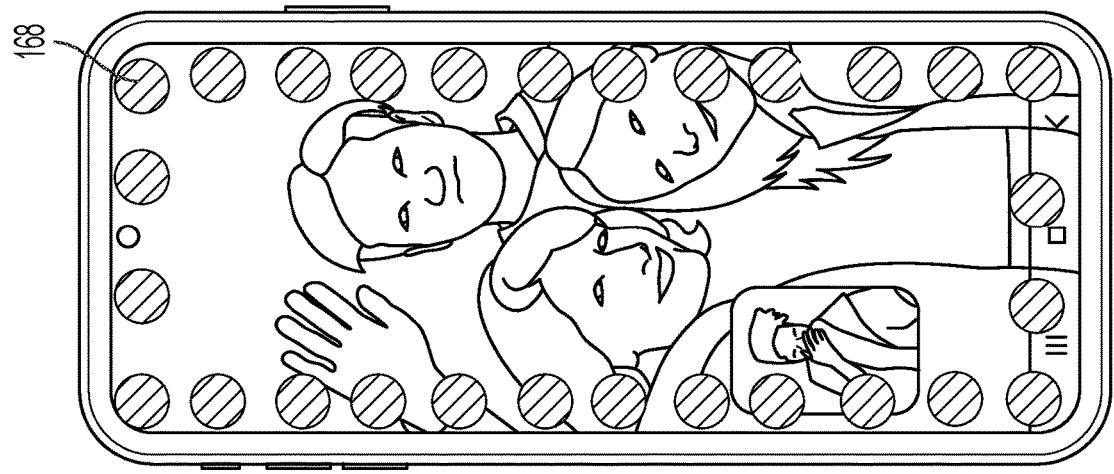
Figure 13:
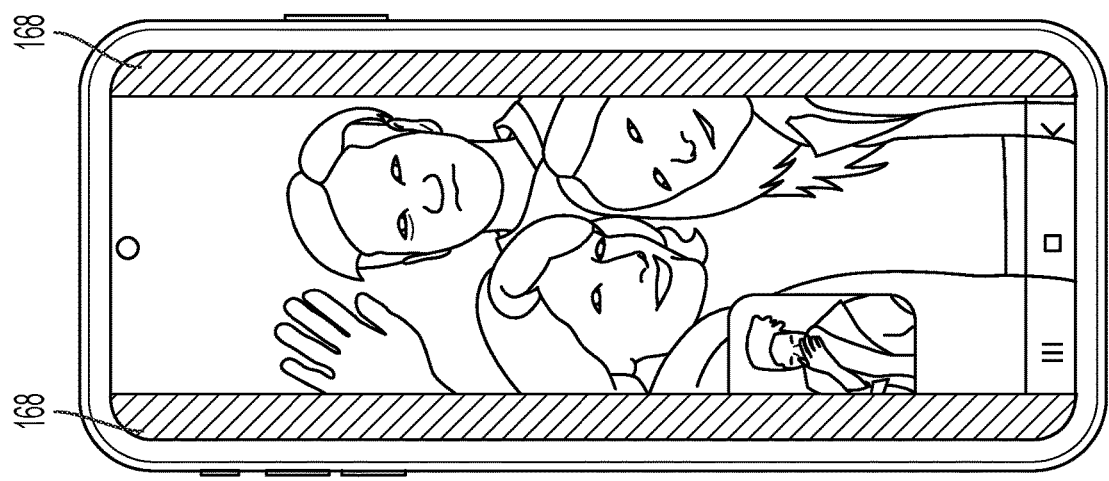
Figure 12:
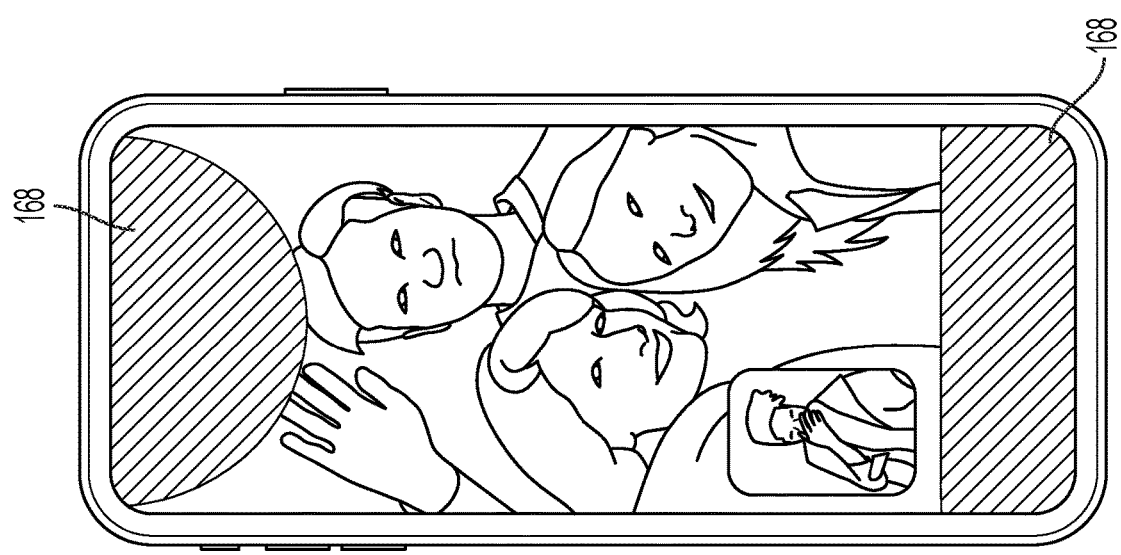
Figure 11:
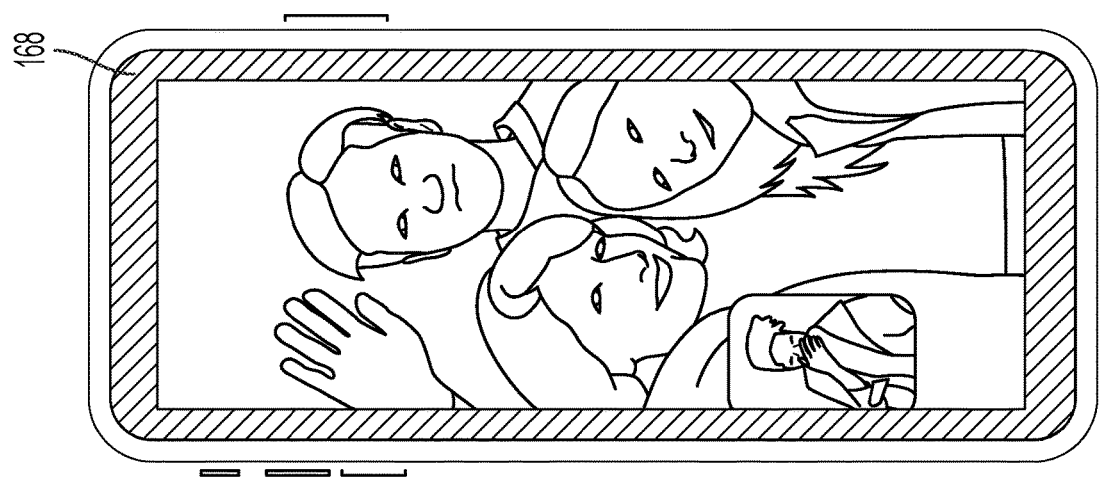
Figure 16:
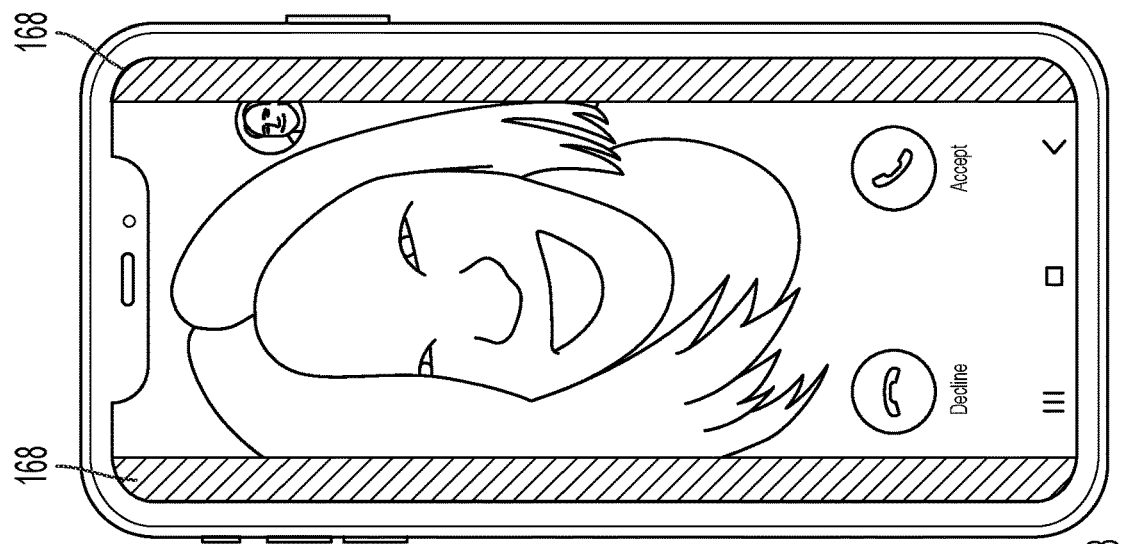
Figure 15:
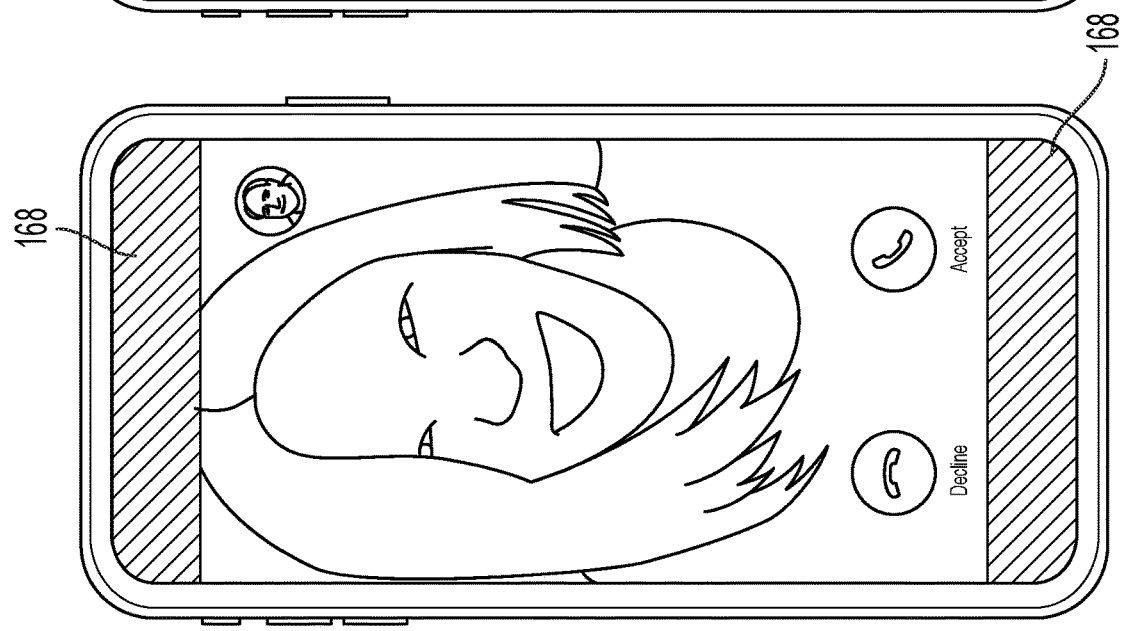
Figure 14:
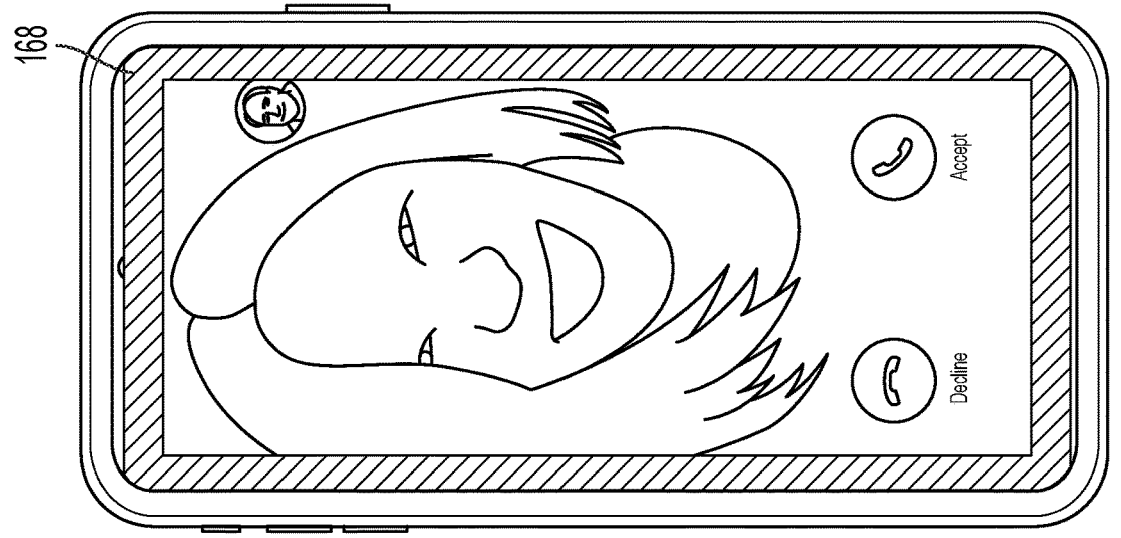

In the example shown in FIG. 7, the second user 105 is segmented from the background 176 of the first video and the entirety of the background 176 is replaced with background lighting elements 168 on the second user device 107.

FIGS. 8-16 illustrate various examples of lighting elements 168 in various configurations and geometries. The varied examples shown in the drawings illustrate how the lighting elements 168 may be foreground lighting elements 168, may be background lighting elements 168, may replace segmented backgrounds 176, may be provided on one or both user devices simultaneously, etc.

Figure 17:
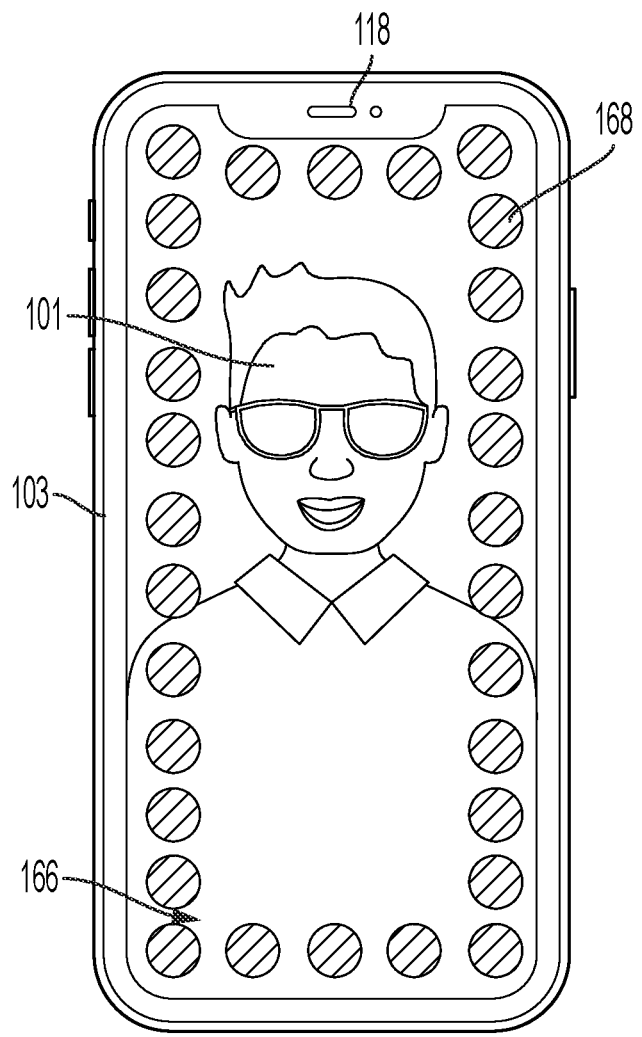
FIG. 17 illustrates an example of the lighting system used when taking a photograph or recording a video using a front facing camera.

Turning now to FIG. 17, an example is provided in which a first user 101 uses a first user device 103 including a front facing camera 118 and a front facing display 166 to take a selfie photograph or record a selfie-style video. Just as shown in the example provided with reference to FIG. 3, the first set of lighting elements 168 are displayed as foreground lighting elements 168 lining the perimeter of the front facing display 166. The lighting elements 168 shown are bright, white pixels that illuminate the face of the first user 101 to improve the lighting of the content to be captured by the first user device 103.

Figure 18:
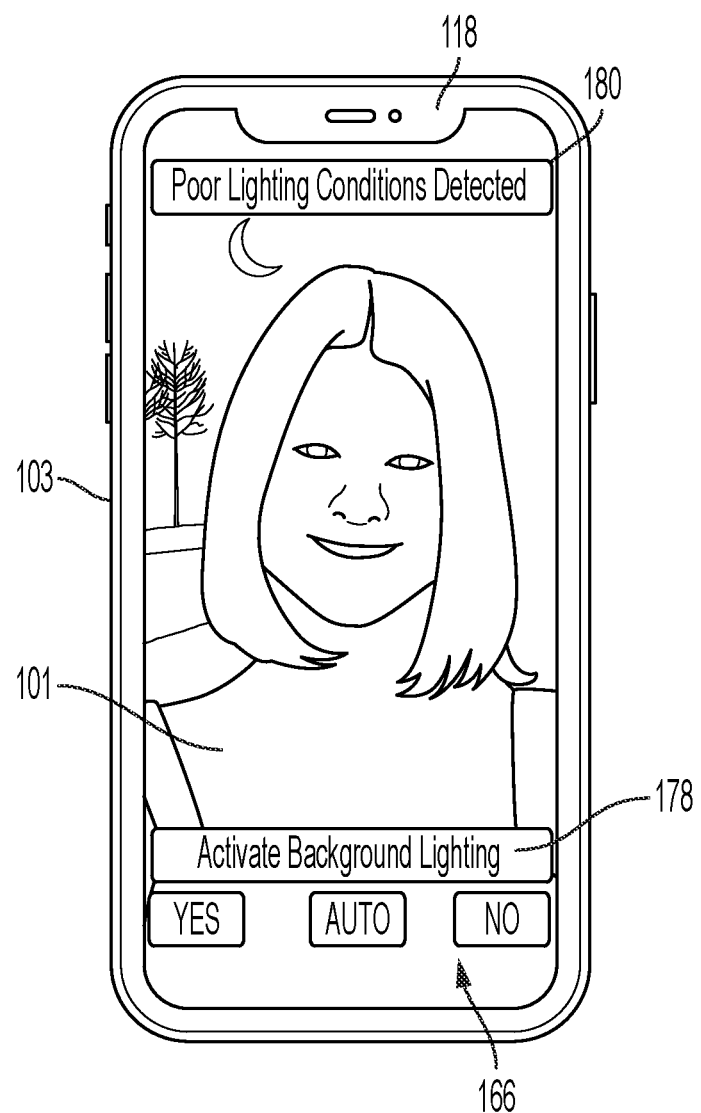
FIG. 18 illustrates an example of lighting options presented to a user when taking a photograph or recording a video using a front facing camera.

FIG. 18 illustrates an example of lighting activation options 178 presented to the user 101 when taking a photograph or recording a video using a front facing camera 118. In the example shown in FIG. 18, when the first user device 103 identifies that the ambient lighting conditions are poor for capturing a well-lit photograph or video, the front facing display 166 presents a notification 180 to the user 101 stating "Poor Lighting Conditions Detected." The display 166 further presents three lighting element activation options 178 for activating lighting, including "yes," "auto," and "no." In this example, the options are provided with respect to background lighting elements 168, though the concepts described herein apply equally to foreground and other lighting elements 168. When the user 101 selects the "yes" option, the lighting elements 168 are activated regardless of the ambient lighting conditions. When the user 101 selects the "auto" option, the lighting elements 168 are activated when the lighting system 100 determines that the lighting quality of the content to be captured will be improved by activating the lighting elements 168. When the user 101 selects the "no" option, the lighting elements 168 are not activated regardless of the ambient lighting conditions.

Figure 19:
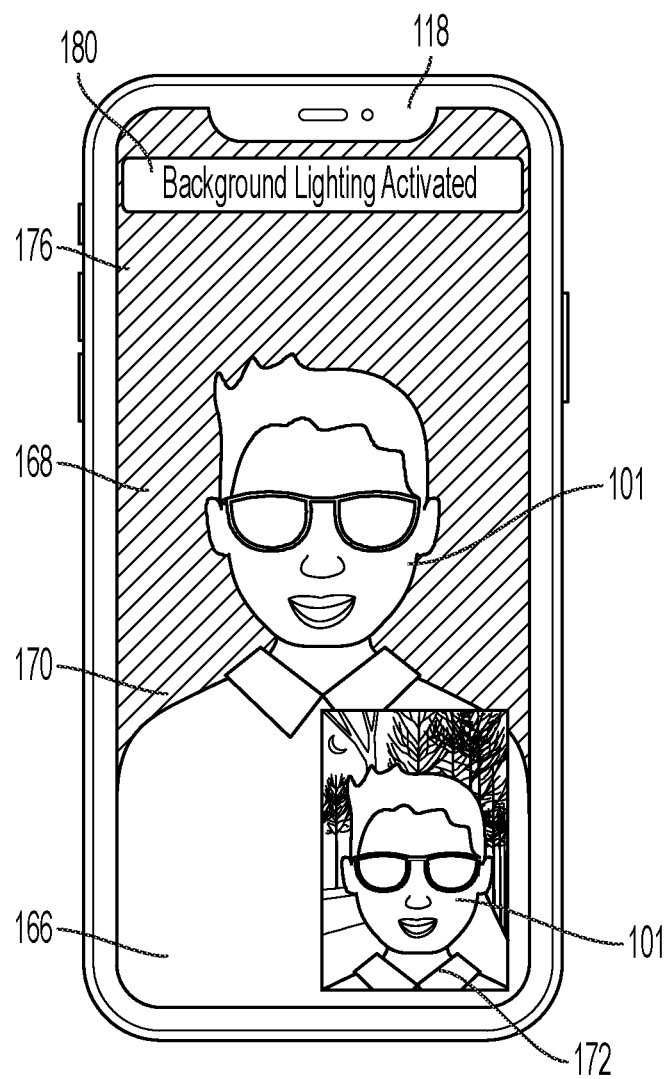
FIG. 19 illustrates an example of using lighting elements to replace a segmented background when taking a photograph or recording a video using a front facing camera.

FIG. 19 illustrates an example of using lighting elements 168 to replace a segmented background 176 when taking a photograph or recording a video using a front facing camera 118. As shown in the example provided in FIG. 19, the display 166 presents a notification 180 that the a "Background Lighting Activated" mode is active. In this mode, a segmented background 176 in the main display element 170 is replaced by lighting elements 168. As further shown in FIG. 19, the display 166 provides a picture-in-picture display element 172 that provides the user 101 a representation of the content to be captured. As shown, the representation in the picture-in-picture display element 172 does not include the lighting elements 168, but instead shows the background that will be captured by the front facing camera 118. In this embodiment, the user 101 is able to see the content that is to be captured while still benefiting from the use of the lighting elements 168.

Figure 20:
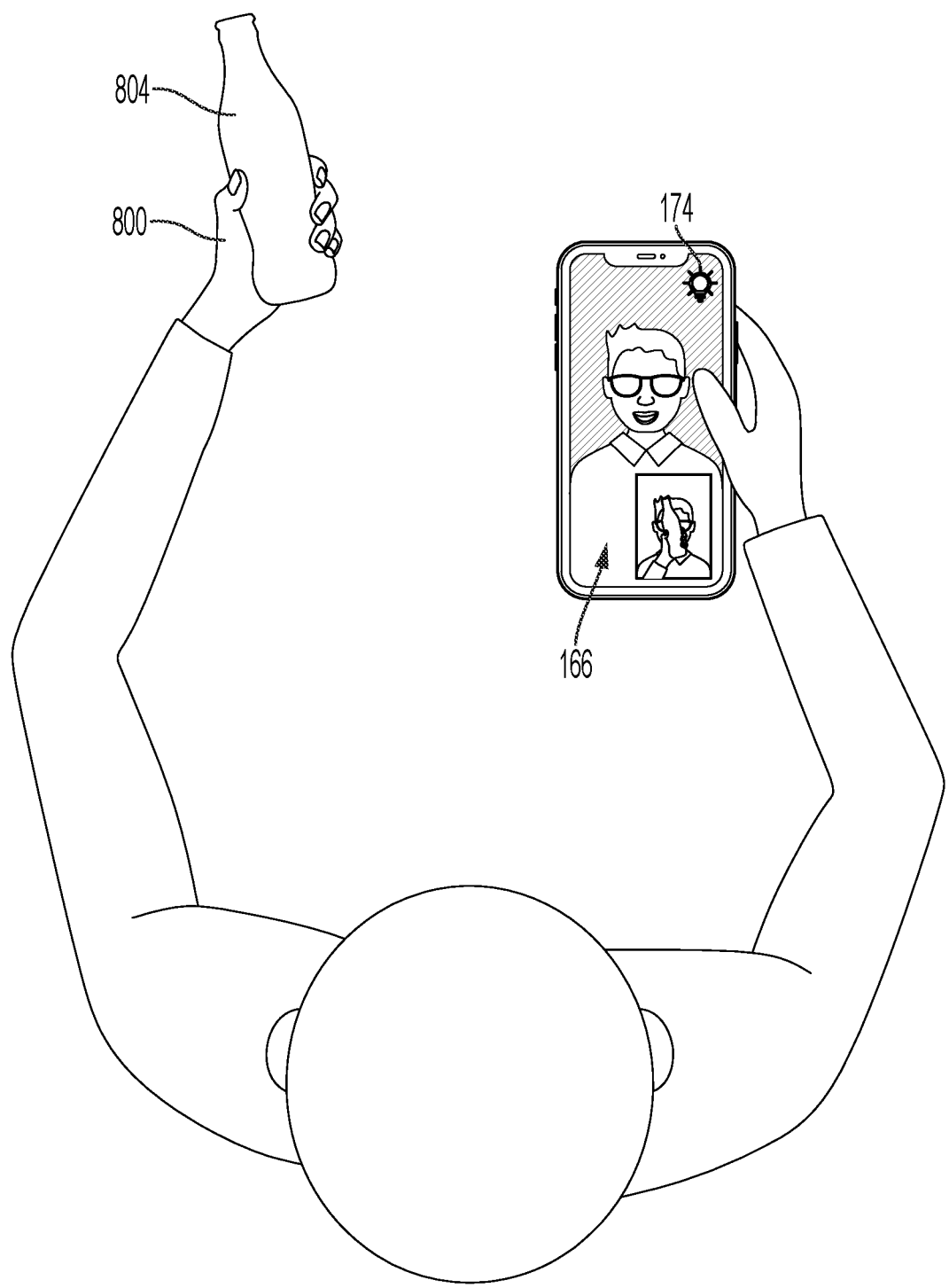
FIG. 20 illustrates an example of a picture-in-picture display that shows the effects of the lighting system when taking a photograph or recording a video using a front facing camera.

FIG. 20 illustrates an example of a picture-in-picture display element 172 that shows the effects of the lighting system 100 when taking a photograph or recording a video using a front facing camera 118. As shown, the picture-in-picture display element 172 presents the user with a representation of the content that would be captured under the lighting conditions in the absence of the activation of the lighting elements 168, which in this example are shown as segmented background lighting elements 168. This presentation enables the user 101 to determine whether the lighting effects 168 are necessary to provide the appropriate lighting conditions. As further shown in FIG. 20, the display 166 presents the user 101 with an illumination indicator 174 to indicate that the lighting elements 168 are active.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A computer-implemented lighting system for video recording and display comprising:
    a first user device featuring a front-facing camera, a front-facing display, a processor, a memory, and a networking interface; and
    a second user device featuring a front-facing camera, a front-facing display, a processor, a memory, and a networking interface;
    wherein the first user device's processor:
        receives a first video captured by the second user device's front-facing camera;
        displays the first video on the first user device's display, wherein a portion of the first video is replaced by one or more lighting elements on the first user device's display; and
        captures a second video using the first user device's front-facing camera, wherein the second video is illuminated during capture, in part, by the one or more lighting elements on the first user device's display,
        wherein the lighting elements displayed on the first user device's display are replicated on a picture-in-picture display on the second user device's display such that the picture-in-picture display on the second user device's display replicates the first user device's display.

2. The system of claim 1, wherein the first video includes video of an object of interest and a background and one of the first user device's processor and the second user device's processor:
    identifies and segments the object of interest from the background in the first video; and
    replaces at least a portion of the segmented background in the first video with the one or more lighting elements.

3. The system of claim 1, wherein an operation of the one or more lighting elements on the first user device's display is user controlled.

4. The system of claim 1, wherein an operation of the one or more lighting elements on the first user device's display is automatically controlled by the first user device's processor.

5. The system of claim 1, wherein the second user device's processor:
    receives the second video captured by the first user device's front-facing camera;
    displays the second video on the second user device's display, wherein a portion of the second video is replaced by a second set of one or more lighting elements on the second user device's display; and
    captures the first video using the second user device's front-facing camera, wherein the first video is illuminated during the capture, in part, by the second set of one or more lighting elements on the second user device's display.

6. The system of claim 1, wherein the lighting elements overlap a picture-in-picture element shown on the first user device's display.

7. The system of claim 1, wherein a brightness of the one or more lighting elements on the first user device's display automatically adjust based on ambient lighting conditions detected by the first user device.

8. The system of claim 1, wherein a brightness of the one or more lighting elements on the first user device's display and a brightness of the first video displayed on the first user device's display are independently adjustable.

9. The system of claim 1, wherein a brightness of the second user device's is controlled by the first user device's processor.

10. The system of claim 1, wherein the one or more lighting elements on the first user device's display replace a segmented background element in the first video.

11. The system of claim 1, wherein the one or more lighting elements on the first user device's display are displayed behind a segmented head and shoulders captured by the second user device's front-facing camera.

12. A computer-implemented lighting system for video recording and display comprising:
    a first user device featuring a front-facing camera, a front-facing display, a processor, a memory, and a networking interface; and
    a second user device featuring a front-facing camera, a front-facing display, a processor, a memory, and a networking interface;
    wherein the first user device's processor:
        receives a first video captured by the second user device's front-facing camera;
        displays the first video on the first user device's display, wherein a portion of the first video is replaced by a first set of one or more lighting elements on the first user device's display;
        automatically adjusts a brightness of the first set of one or more lighting elements on the first user device's display based on ambient lighting conditions detected by the first user device; and
        captures a second video using the first user device's front-facing camera, wherein the second video is illuminated during capture, in part, by the one or more lighting elements on the first user device's display;
    wherein the second user device's processor:
        receives the second video captured by the first user device's front-facing camera;
        displays the second video on the second user device's display, wherein a portion of the second video is replaced by a second set of one or more lighting elements on the second user device's display;
        automatically adjusts a brightness of the second set of one or more lighting elements on the second user device's display based on ambient lighting conditions detected by the second user device; and
        captures the first video using the second user device's front-facing camera, wherein the first video is illuminated during the capture, in part, by the one or more lighting elements on the second user device's display,
    wherein the first set of one or more lighting elements displayed on the first user device's display are replicated on a picture-in-picture display on the second user device's display such that the picture-in-picture display on the second user device's display replicates the first user device's display and second set of one or more lighting elements displayed on the second user device's display are replicated on a picture-in-picture display on the first user device's display such that the picture-in-picture display on the first user device's display replicates the second user device's display.

13. The system of claim 12, wherein, the first video includes video of an object of interest and a background and one of the first user device's processor and the second user device's processor:

identifies and segments the object of interest from the background in the first video; and replaces at least a portion of the segmented background in the first video with the first set of one or more lighting elements; and the second video includes video of an object of interest and a background and one of the first user device's processor and the second user device's processor:

identifies and segments the object of interest from the background in the second video; and replaces at least a portion of the segmented background in the second video with the second set of one or more lighting elements.

14. The system of claim 12, wherein a brightness of the first set of one or more lighting elements on the first user device's display and a brightness of the first video displayed on the first user device's display are independently adjustable and a brightness of the second set of one or more lighting elements on the second user device's display and a brightness of the second video displayed on the second user device's display are independently adjustable.

15. The system of claim 12, wherein a brightness of the first set of one or more lighting elements is additionally controlled by the second user device's processor and wherein a brightness of the second set of one or more lighting elements is additionally controlled by the first user device's processor.

16. The system of claim 12, wherein a brightness of the first set of one or more lighting elements is additionally controlled by the first user device's processor and wherein a brightness of the second set of one or more lighting elements is additionally controlled by the second user device's processor.

17. The system of claim 12, wherein the first set of one or more lighting elements on the first user device's display are displayed behind a segmented head and shoulders captured by the second user device's front-facing camera and the second set of one or more lighting elements on the second user device's display are displayed behind a segmented head and shoulders captured by the first user device's front-facing camera.

* * * * *